United States Patent [19]

Kaneko

[11] Patent Number: 5,035,374
[45] Date of Patent: Jul. 30, 1991

[54] DRAG DEVICE FOR FISHING REELS

[75] Inventor: Kyoichi Kaneko, Tokyo, Japan

[73] Assignee: Daiwa Seiko Inc., Tokyo, Japan

[21] Appl. No.: 381,342

[22] Filed: Jul. 18, 1989

[30] Foreign Application Priority Data

| Aug. 19, 1988 | [JP] | Japan | 63-206151 |
| Dec. 9, 1988 | [JP] | Japan | 63-311477 |
| Dec. 9, 1988 | [JP] | Japan | 63-311478 |

[51] Int. Cl.$^5$ .................................. A01K 89/015
[52] U.S. Cl. .................... 242/264; 242/249
[58] Field of Search ............ 245/255, 268, 264, 249

[56] References Cited

U.S. PATENT DOCUMENTS

| 2,388,979 | 11/1945 | King | 242/264 |
| 2,417,732 | 3/1947 | Bland | 242/255 |
| 2,918,227 | 12/1959 | Mauborgne | 242/255 |
| 4,566,655 | 1/1986 | Young | 242/255 |
| 4,779,819 | 10/1988 | Emura | 242/268 |
| 4,871,129 | 10/1989 | Hashimoto | 242/255 |
| 4,927,095 | 5/1990 | Young | 242/261 |
| 4,966,335 | 10/1990 | Kaneko | 242/268 X |

FOREIGN PATENT DOCUMENTS

| 3807468 | 9/1989 | Fed. Rep. of Germany . |
| 585126 | 1/1983 | Japan . |
| 61-12374 | 1/1986 | Japan . |
| 204472 | 12/1987 | Japan . |
| 2121261 | 12/1983 | United Kingdom . |

Primary Examiner—Katherine Matecki
Attorney, Agent, or Firm—Browdy and Neimark

[57] ABSTRACT

A drag device for double bearing type fishing reels, comprising a handle shaft supported on side plates of a reel, a driving gear meshed with a spool shaft-turning pinion, and a sun gear, which are fitted around the handle shaft, a support member which has planetary gears supported rotatable thereon, and which is mounted on the handle shaft so that the support member can be turned unitarily therewith, an internal gear formed on the inner circumferential surface of the driving gear so that the planetary gears are meshed with the sun gear and internal gear, a braking gear supported on the side plates of the reel and adapted to generate a braking force which can be regulated by a regulating knob, a gear meshed with the braking gear and adapted to be turned unitarily with the sun gear, and a reverse rotation preventing mechanism provided on the handle shaft..This drag device enables a set dragging performance to be fully displayed even during a fishing line take-up operation, and the dragging force to be regulated speedily with ease during the fishing. This prevents the breakage of a fishing line from occurring, and allows a fishing operation to be carried out smoothly.

11 Claims, 6 Drawing Sheets

DRAG DEVICE FOR FISHING REELS

BACKGROUND OF THE INVENTION

1. Field of the Invention

This invention relates to a drag device for fishing reels, especially, double bearing type fishing reels.

2. Description of the Prior Art

The known drag devices for double bearing type fishing reels include a drag device of a system in which a drag mechanism is provided on a handle shaft as disclosed in, for example, Japanese Utility Model Laid-Open No. 12374/1986, and a drag device of a system in which a drag mechanism is provided on a spool shaft as disclosed in, for example, Japanese Utility Model Laid-Open No. 204476/1987.

In the drag device of a system in which a drag mechanism is provided on a handle shaft, a drag regulating knob is turned with the handle shaft. Therefore, a drag regulating operation cannot be carried out while a fishing line is wound, and the dimensions of the drag regulating knob are limited, so that the regulating operation cannot be carried out speedily and smoothly. In the drag device of a system in which a drag mechanism is provided on a spool shaft, these drawbacks can be eliminated. However, since the spool shaft is rotated with the pressing force of the spool shaft, which is pressed axially, applied to a bearing, the spool shaft in rotary motion becomes heavy, and a spool also becomes heavy due to the drag mechanism, so that the rotating performance of the spool during a fishing line casting operation becomes inferior. Moreover, since this drag mechanism is formed so that it serves also as a clutch, it cannot be operated as an independent clutch, and the operability thereof is low.

The techniques for eliminating the drawbacks encountered in these two types of drag devices are known from the specification of Japanese Patent Laid-Open No. 5126/1983. According to the techniques, a driving gear is coupled to a handle shaft directly only during a fishing line take-up operation, and a drag mechanism is provided on a shaft other than the handle shaft and a spool shaft and directly coupled to a pinion on the spool shaft via a gear, whereby the braking of the drag mechanism is done only when the spool is rotated reversely.

However, when a fish draws the fishing line with a force larger than the dragging force of a drag device of this system during a fishing line take-up operation, a fishing line take-up action is made preferentially with the driving gear coupled directly to the handle shaft, so that a dragging operation is not carried out in accordance with the level of the fishing line drawing force of the fish to cause the fishing line to be broken.

SUMMARY OF THE INVENTION

A primary object of the present invention is to eliminate the drawbacks encountered in a drag device of a conventional system, by utilizing planetary gears in view of the present status of the techniques in this field, and provide a drag device capable of fully displaying a set dragging performance even during a fishing line take-up operation and thereby reliably preventing the breakage of a fishing line being taken up.

Another object of the present invention is to provide a drag device for fishing reels, which is provided with planetary gears on a handle shaft so that the planetary gears are meshed with a braking gear mounted on a shaft other than the handle shaft and a spool shaft, and which thereby enables a dragging action to be made preferentially not only during the reverse rotation of a spool but also during a fishing line take-up operation, and a set dragging performance to be fully displayed, so that a drag slipping state is obtained, whereby the breakage of the fishing line during a fishing operation can be reliably prevented.

Still another object of the present invention is to provide a drag device for fishing reels, which can prevent a spool from receiving a pressing force during a drag regulating operation, and which has separate drag and clutch functions, whereby the drag device enables a handle to be operated lightly during a fishing line take-up operation, and the deterioration of the casting performance to be prevented.

A further object of the present invention is to provide a drag device for fishing reels, which is provided with a drag regulating knob mounted on a shaft other than and spaced from a handle shaft, whereby the drag device enables a drag regulating operation to be carried out even during a fishing line take-up operation, the diameter of the drag regulating knob to be increased, and a drag regulating operation to be carried out speedily and smoothly.

A further object of the present invention is to provide a drag device for fishing reels, which is capable of changing a driving system including the levels of input, output and braking in the planetary gears, whereby the drag device enables a fishing line take-up gear ratio and a braking gear ratio to be increased and decreased easily, so that the drag device can be used suitably for meeting the purpose thereof.

The above and other objects as well as advantageous features of the invention will become apparent from the following description of the preferred embodiments taken in conjunction with the accompanying drawings.

DESCRIPTION OF THE PREFERRED EMBODIMENTS

Figure 1:
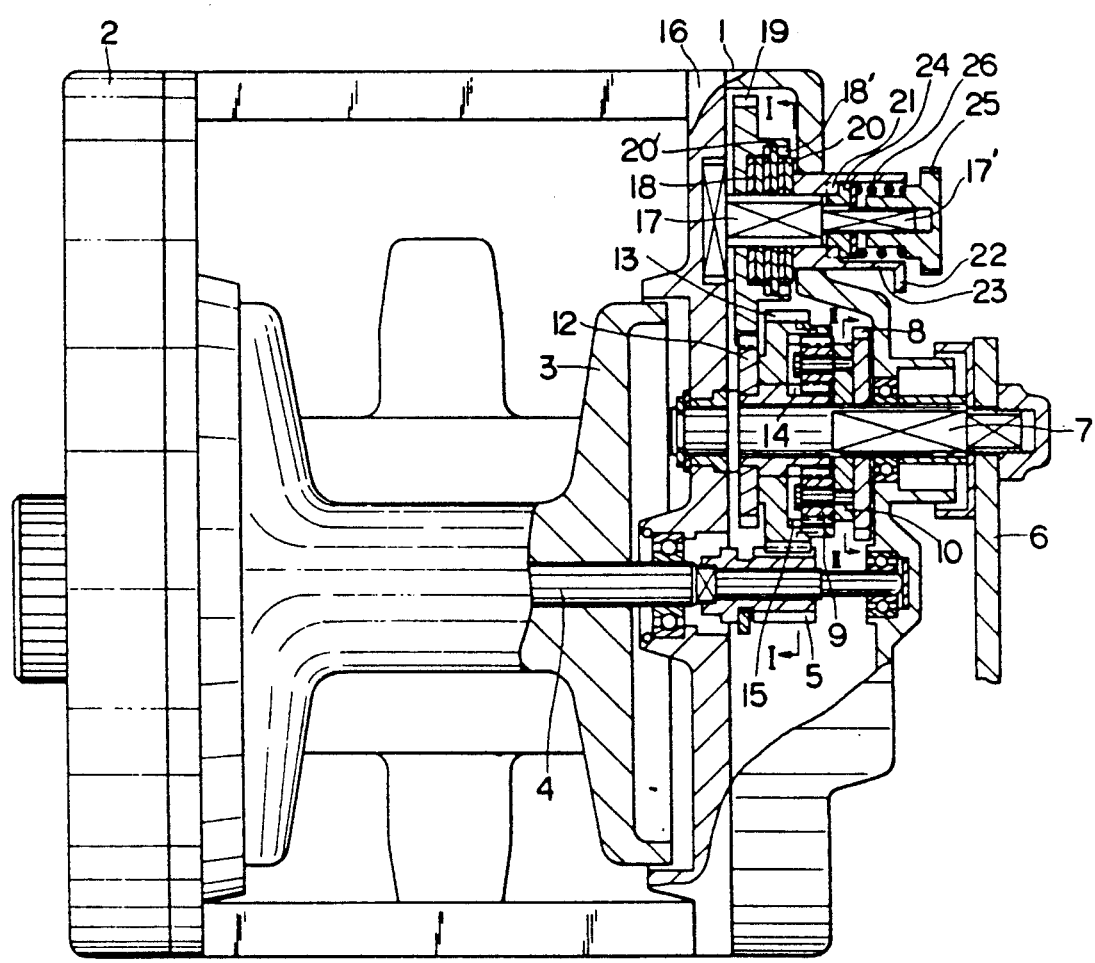
FIG. 1 is a partially cutaway view in plan of a principal portion of the present invention.
Figure 2:
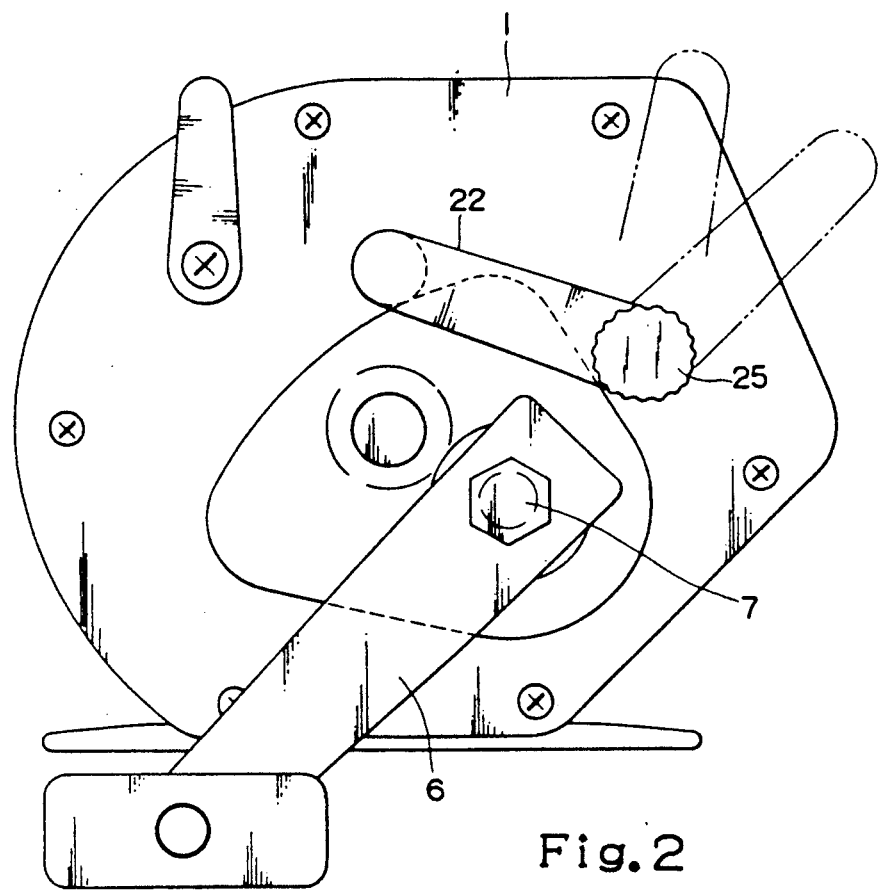
FIG. 2 is a side elevation of what is shown in FIG. 1.
Figure 3:
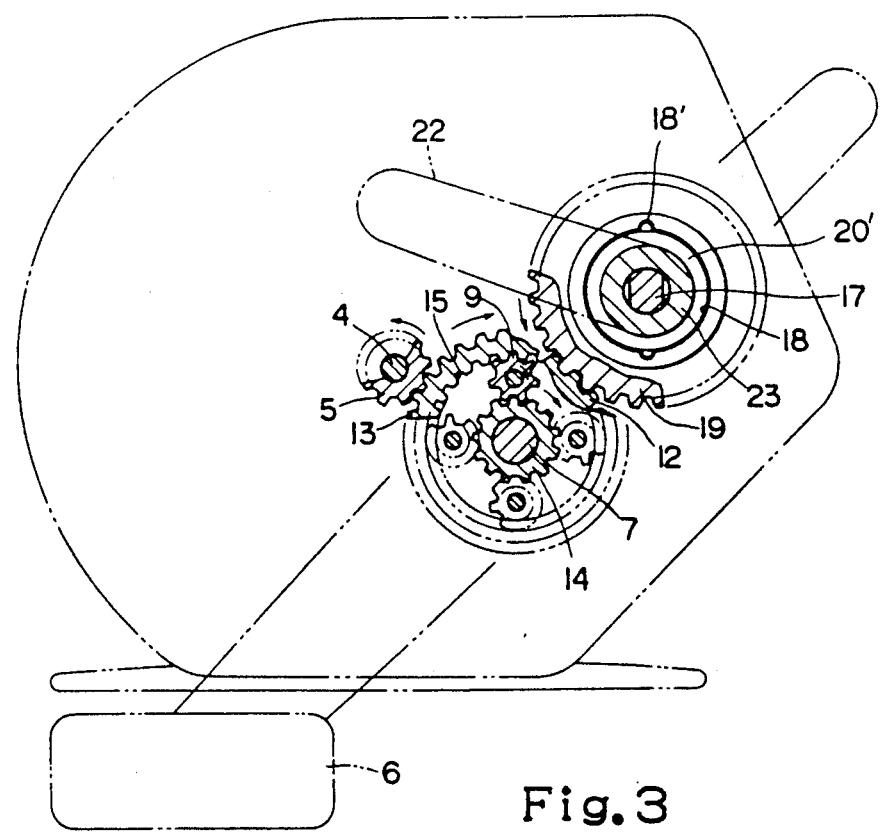
FIG. 3 is a sectional view taken along the line III—III in FIG. 1.
Figure 4:
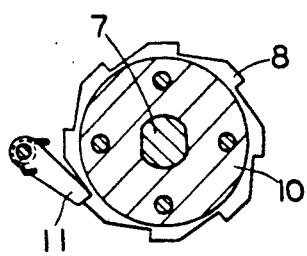
FIG. 4 is a sectional view taken along the line IV—IV in FIG. 1.

The details of the present invention will now be described with reference to its embodiments. FIGS. 1-5 show an embodiment and a modified example of drag devices having a small fishing line take-up gear ratio and a large drag braking gear ratio.

A spool shaft 4 supported rotatably between side plates 1, 1 of a reel and having a spool 3 mounted fixedly thereof is provided thereon with a pinion 5 with and from which a clutch can be engaged and disengaged in a known manner. A handle shaft 7 supported rotatably on the side plates 1 and having a handle 6 thereon is provided thereon with a ratchet wheel 8 and a planetary gear support 10 having planetary gears 9, 9 supported rotatably on the same circumference thereof, in such a manner that the ratchet wheel 8 and planetary gear support 10 are rotated unitarily with the handle shaft 7. A stopper 11 provided on a side plate of the reel is engaged with the ratchet wheel 8 so as to prevent the reverse rotation of the handle shaft 7.

The handle shaft 7 is further provided thereon with a sun gear 14 having a gear 12 on the inner end surface thereof, and a driving gear 13 meshed with the pinion 5 and fitted rotatably to handle shaft 7 to rotate together with sun gear 14. The planetary gears 9, 9 ... are meshed with the sun gear 14 and an internal gear 15 formed on the inner circumferential portion of the driving gear 13.

A cross-sectionally annular braking shaft 17 having a smaller-diameter threaded portion 17' at its front end section projects outward from a frame 16 joined to the side plates 1 of the reel. The braking shaft 17 is provided thereon with a braking gear 19, which has a recess 18, and which is meshed with the gear 12, in such a manner that the braking gear 19 can be turned. The recess 18 in the braking gear 19 houses therein a braking plate 20, which is fitted around the braking shaft 17 so that the braking plate 20 can be moved in the axial direction only, and a braking plate 20' fitted around the braking shaft 17 so that the braking plate 20' can be turned and so that the braking plate 20' is engaged with an axially extending groove 18' in the recess 18. A regulating cylinder 23 having a cam locking portion 21 and a lever 22, which is provided at the outer end of the cylinder 23, is engaged with the outer side of the braking plates 20, 20'.

The smaller-diameter threaded portion 17' is provided thereon with a cam 24, which has a cam surface opposed to the cam locking portion 21, in such a manner that the cam 24 can be moved in the axial direction only, and also a finely regulating knob 25 screwed thereon, a spring 26 being provided between a flange portion of the finely regulating knob 25 and the cam 24.

Figure 5:
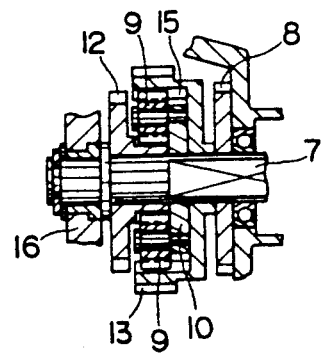
FIG. 5 is a longitudinally sectioned plan of a modified example of the present invention.
Figure 6:
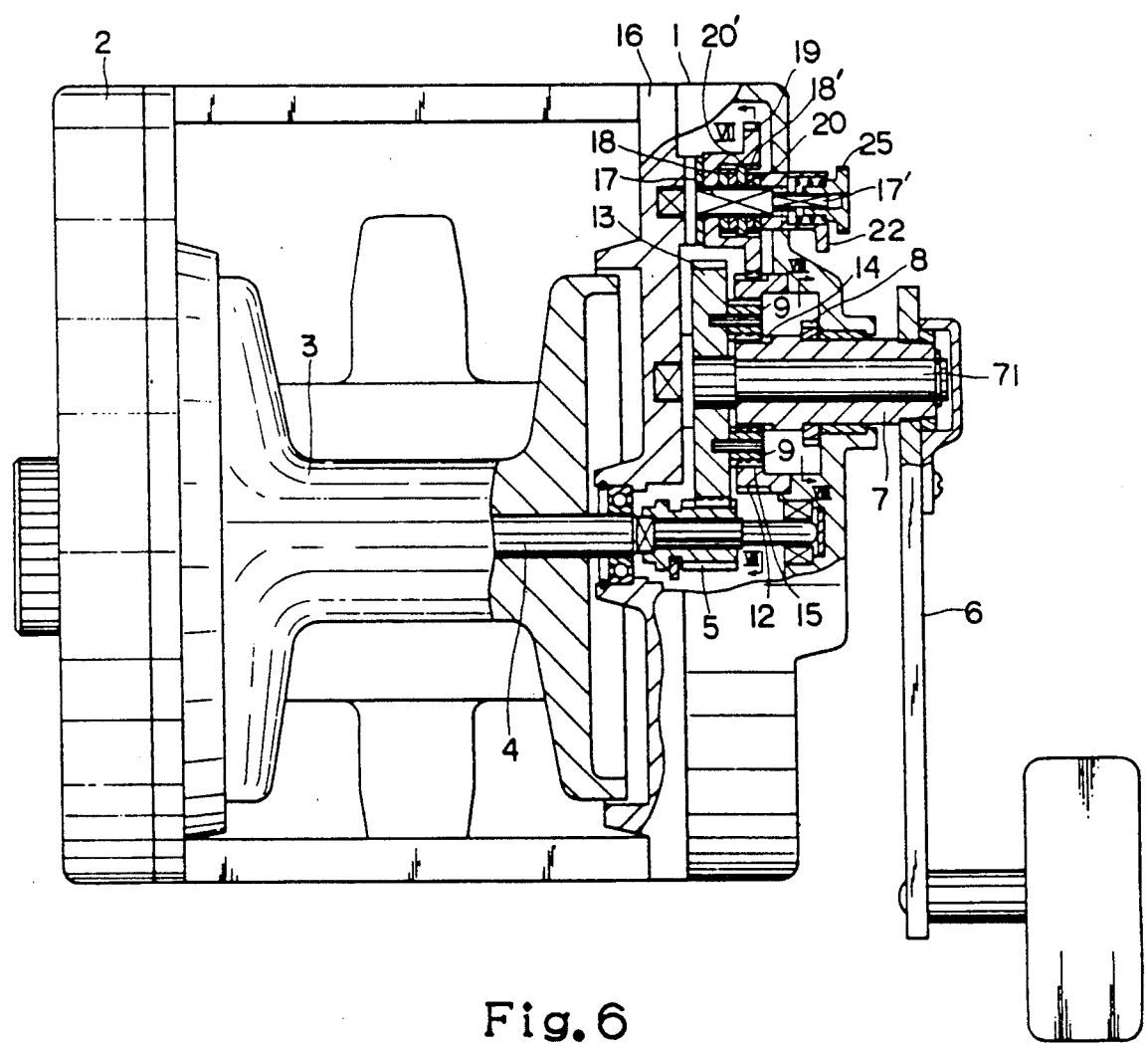
FIG. 6 is a partially cutaway view in plan of a principal portion of another embodiment of the present invention.

FIG. 5 shows a modified example in which a driving gear 13 is fitted directly around a handle shaft 7 so that the driving gear 13 can be turned, instead of being fitted firmly around a sun gear 14.

In such embodiment and modified example, a drag range is set in advance by the finely regulating knob 25, and a desired dragging force is then set by the lever 22.

When the handle shaft 7 in the drag device in this state is turned by the handle 6, the planetary gear support 10, which is mounted unitarily on the handle shaft 7 is turned, while the sun gear 14 does not turn in accordance with a preset braking force since the gear formed unitarily with the sun gear 14 is meshed with the braking gear 19. The planetary gears 9, 9 ... are turned around the sun gear 14 as they revolve on their own axes, to cause the driving gear 13 to be turned. Consequently, the spool 3 is turned by the driving gear 13 via the pinion 5 and spool shaft 4 to take up the fishing line.

When a spool load increases to exceed the set braking force, the driving gear 13 meshed with the pinion 5 is stopped, and the planetary gears 9, 9 ... are turned around the sun gear 14 as they are rotated on their own axes by the internal gear 15, to turn the sun gear 14, so that the drag device is put in a slipping state even when the handle is in a fishing line take-up operation.

When a load larger than the dragging force set in the braking gear 19 is imparted to the spool 3 with the handle not in a fishing line take-up operation, the planetary gear support 10 mounted unitarily on the handle shaft 7 is not reversely turned since the reverse rotation of the ratchet 8 is prevented by the stopper 11, and the sun gear 14 is turned via the pinion 5, driving gear 13 and planetary gears 9, 9 ... against the braking force of the braking gear 19. Consequently, the drag device is put in a drag slipping state, and the spool 3 is rotated reversely, so that the fishing line is paid out.

FIGS. 6-11 show an embodiment and modified examples of fishing reels in which both a fishing line take-up gear ratio and a drag braking gear ratio are small.

In these fishing reels, a cylindrically formed handle shaft 7 is fitted rotatably around a support shaft 71 projecting from a frame 16 joined to side plates 1 of the reel. A sun gear 14 is formed directly on and unitarily with the handle shaft 7, and a driving gear 13 meshed with a pinion 5 is mounted on the support shaft 71 so that the driving gear 13 can be turned. The planetary gears 9 are supported rotatably on a side surface of the driving gear 13, and a gear 12 meshed with a braking gear 19 is supported on the side plates 1 of the reel so that the gear 12 can be turned, an internal gear 15 being formed on the inner circumferential surface of this gear 12, the planetary gears 9 being thereby meshed with the sun gear 14 and internal gear 15.

Figure 11:
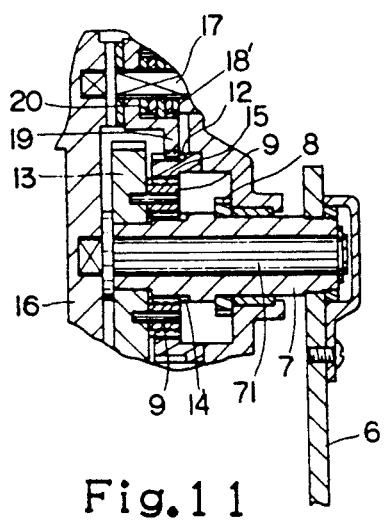
FIGS. 9-11 are longitudinally sectioned plans of modified examples of the present invention.
Figure 10:
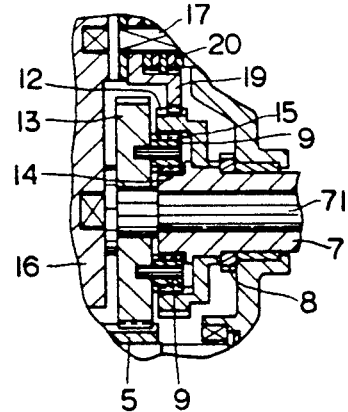
Figure 9:
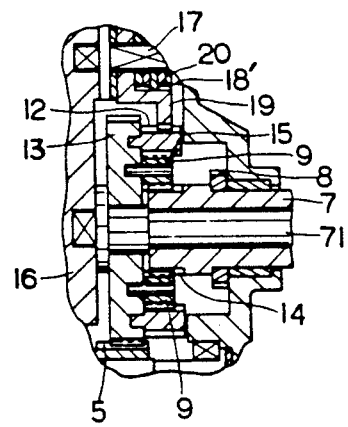
Figure 12:
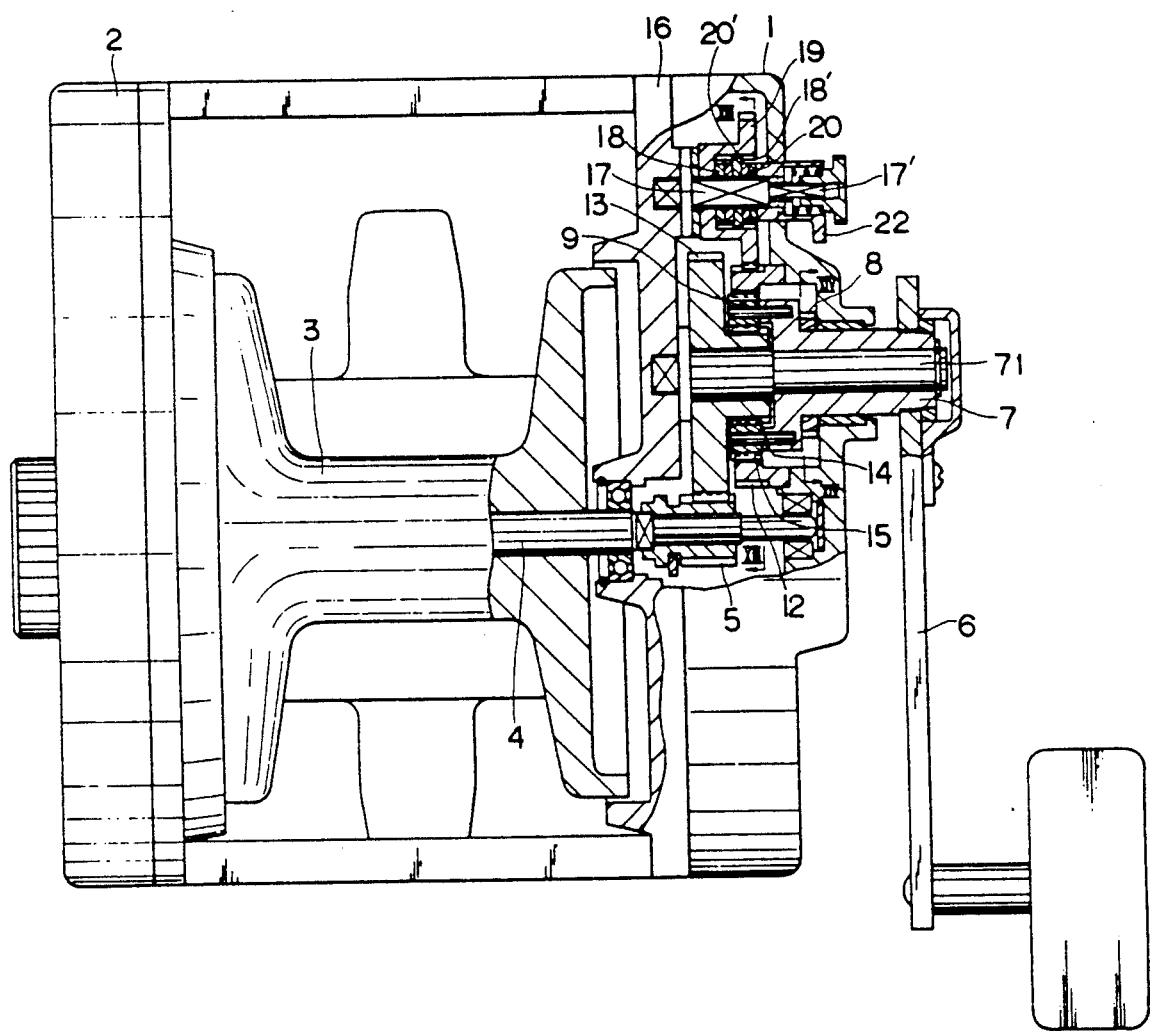
FIG. 12 is a partially cutaway view in plan of a principal portion of still another embodiment of the present invention.
Figure 13:
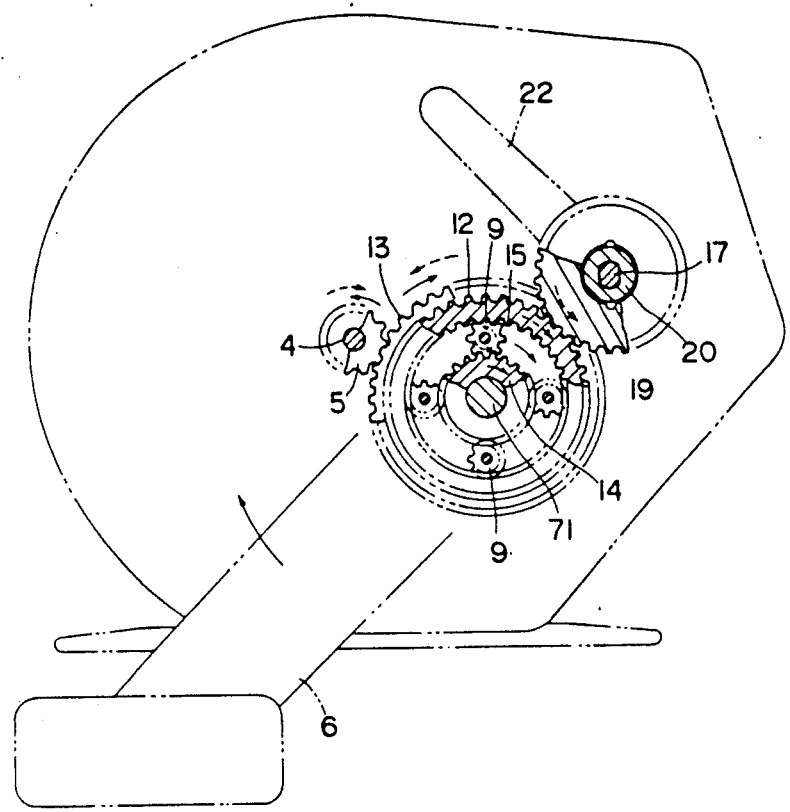
FIG. 13 is a sectional view taken along the line XIII—XIII in FIG. 12.

FIG. 9 shows a modified example in which the gear 12 in the above embodiment is supported on the driving gear 13 so that the gear 12 can be turned, FIG. 10 a modified example in which the gear 12 is supported on the handle shaft 7 so that the gear 12 can be turned, and FIG. 11 a modified example in which the driving gear 13 is mounted on the handle shaft 7 so that the driving gear 13 can be turned.

In these drag devices, the dragging force of the barking gear 19 is set to a predetermined level by the drag regulating knob 25. When the handle shaft 7 is then turned by the handle 6 in the clockwise direction of a solid arrow of FIG. 7, i.e., in the fishing line take-up direction, the sun gear 14 mounted unitarily on the handle shaft is turned, while the planetary gears 9, 9 are turned clockwise around the sun gear 14 as they are rotated counter-clockwise on their own axes since the internal gear 15 is kept stopped owing to the dragging force of the braking gear 19. The turning of the planetary gears 9, 9 causes the driving gear 13 to be turned clockwise, and the fishing line is taken up around the spool 3 via the pinion 5 and spool shaft 4.

When a load on the spool 3 increases in such fishing line take-up condition to exceed the set level of the dragging force of the braking gear 19, the driving gear 13 meshed with the pinion 5 stops being turned to cause the sun gear 14 to turn clockwise. Consequently, the planetary gears 9, 9 ... are turned counter-clockwise without turning around the sun gear 14 to cause the braking gear 19 to be slip-turned in the clockwise direction against the dragging force thereof.

Figure 7:
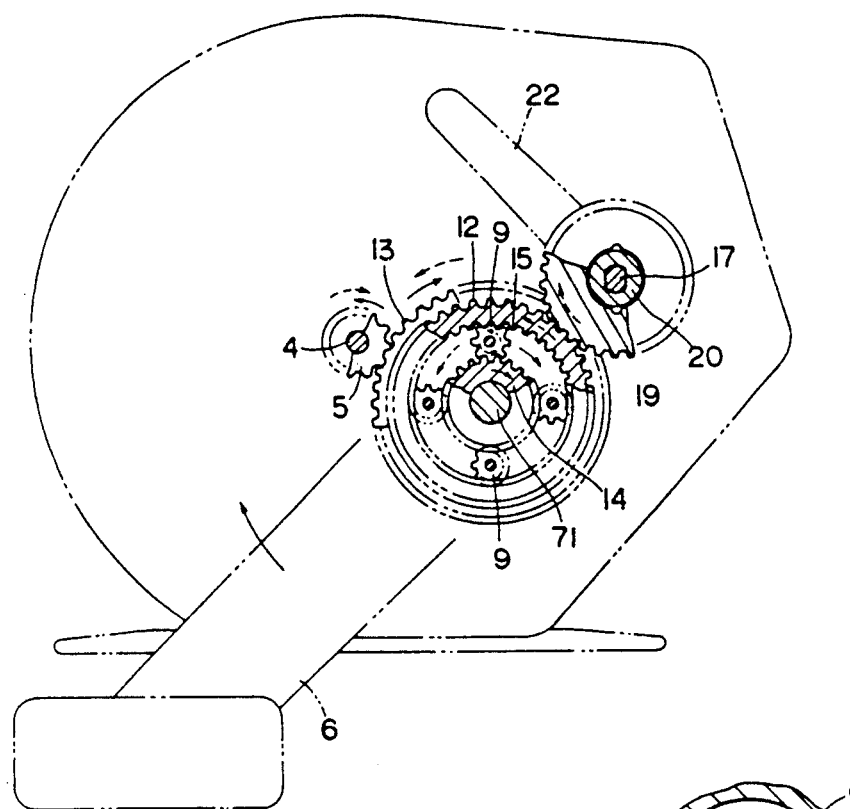
FIG. 7 is a sectional view taken along the line VII—VII in FIG. 6.
Figure 8:
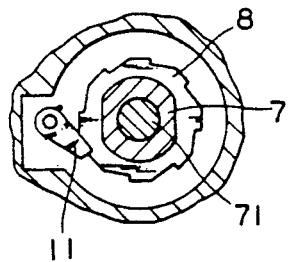
FIG. 8 is a sectional view taken along the line VIII—VIII in FIG. 6.

When a load larger than the dragging force of the braking gear 19 is imparted to the spool 3 with a fishing line take-up operation not carried out by the handle 6, the driving gear 13 is turned via the pinion 5 in the counter-clockwise direction as shown by a chain arrow in FIG. 7, and the planetary gears 9, 9 . . . are also turned counter-clockwise. Since the reverse rotation of the sun gear 14 is prevented by the stopper pawl 11, the planetary gears 9, 9 . . . are turned counter-clockwise on their own axes owing to the effect thereof in turning around the sun gear 14, to cause the gear 12 to be turned counter-clockwise. Consequently the braking gear 19 is slip-turned in the clockwise direction against the dragging force thereof to enable the fishing line to be paid out.

FIGS. 12-16 show an embodiment and modified examples of fishing reels having a large take-up gear ratio and a small drag braking ratio so that the fishing reel can be used suitably for the high-speed take-up of the fishing line.

In this embodiment, planetary gears 9, 9 . . . are supported rotatably on the inner end portion of a cylindrical handle shaft 7 which is fitted rotatably around a support shaft 71 projecting from a frame 16 joined to the side plates 1 of the reel, and a sun gear 14 is formed unitarily with a driving gear 13 meshed with a pinion 5, the sun gear 14 being mounted on the support shaft 71 so that the sun gear 14 can be turned. A gear 12 meshed with a braking gear 19 is supported on the side plates 1 of the reel so that the gear 12 can be turned, and an internal gear 15 is formed on the inner circumferential surface of this gear 12. The planetary gears 9, 9 . . . are meshed with the internal gear 15 and sun gear 14.

Figures 14, 15, 16:
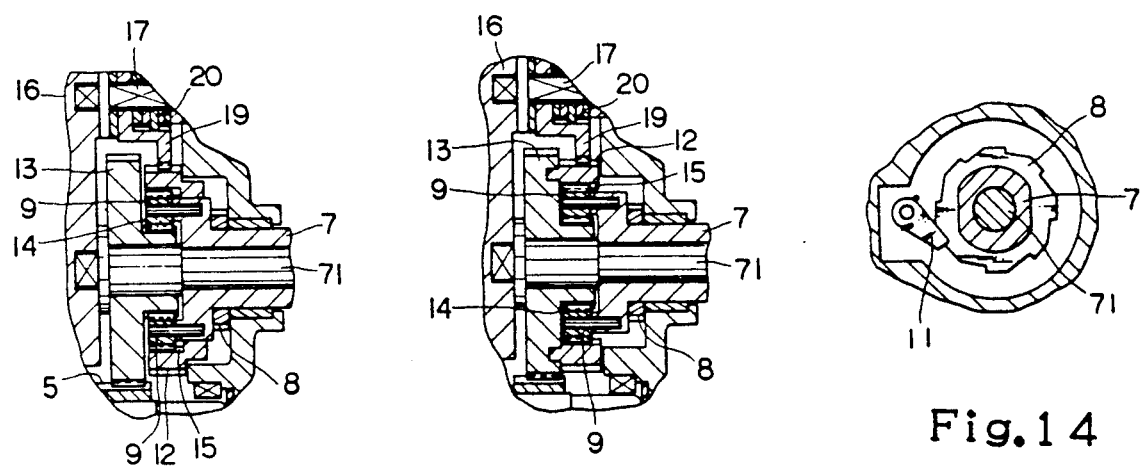
FIG. 14 is a sectional view taken along the line XIV—XIV in FIG. 12.
FIGS. 15 and 16 are longitudinally sectioned plans of modified examples of the present invention.

FIG. 15 shows a modified example in which the gear 12 in this embodiment is supported on the driving gear 13 so that the gear 12 can be turned, and FIG. 16 a modified example in which the gear 12 is supported on the handle shaft 7 so that the gear 12 can be turned.

In the above embodiment and modified examples, the take-up of a fishing line is carried out as follows. When the handle shaft 7 is turned by the handle 6 in the clockwise direction as shown by a solid arrow in FIG. 13, the planetary gears 9, 9 . . . supported thereof are turned around the sun gear in the same direction. Since the gear 12 having the internal gear 15 is meshed with the braking gear 19 so that the rotation of the gear 12 is prevented in accordance with the level of a set dragging force, the planetry gears 9, 9 . . . are rotated on their own axes in the counter-clockwise direction at the same time to turn the sun gear 14 clockwise. Consequently, the driving gear 13 provided unitarily on the sun gear 14 turns the spool 3 via the pinion 5 and spool shaft 4 to take up the fishing line.

When a load on the spool increases during this fishing line take-up operation to exceed the level of the set dragging force, the driving gear 13 meshed with the pinion 5 is kept stopped, and the planetary gears 9, 9 are turned around the sun gear 14 as they are rotated clockwise on their own axes, by the turning movement of the handle shaft to turn the gear 12. Consequently, the braking gear 19 are slip-turned against the dragging force thereof, so that the reel is put in a drag-slipping state even while the fishing line is taken up by the handle.

When a load larger than the dragging force set in the braking gear 19 is imparted to the spool 3 with a fishing line take-up operation by the handle not carried out, the handle shaft 7 is not turned reversely since the reverse rotation of the ratchet 8 is prevented by the stopper 11. Accordingly, the driving gear 13 is turned counterclockwise as shown by a chain line in FIG. 13, and the sun gear 14 formed unitarily on the driving gear 13 is turned reversely. Consequently, the planetary gears 9, 9 are rotated clockwise only on their own axes to turn the gear 12 clockwise via the internal gear 15, so that the braking gear 19 is turned against the dragging force thereof. The reel is put in a drag-slipping state, and the spool 3 is turned reversely, so that the fishing line is paid out.

The means for regulating the dragging force of the braking gear 19 in the present invention consists of the regulating cylinder 23 and finely regulating knob 25 according to the above-described embodiments, and is formed so that the dragging force can be regulated in two steps by these parts but the dragging force may not necessarily be regulated in two steps.

Thus, in the drag device according to the present invention, the set dragging performance is fully displayed to obtain a drag-slipping state by utilizing the planetary gears mounted on the handle shaft, not only when the spool is turned reversely but also when the fishing line is taken up. This reliably prevents the breakage of the fishing line during a fishing operation, and enables a fishing operation to be carried out easily and smoothly. Moreover, the difficulty in operating the handle and the deterioration of the casting performance, which are encountered in a drag device of a conventional system, do not occur in the drag device according to the present invention. According to the present invention, a drag regulating operation during the fishing can also be carried out speedily and with ease.

The present invention enables a fishing line take-up gear ratio and a braking gear ratio to be used selectively in accordance with the purpose of use of the reel by changing a driving system for each part of the planetary gears.

The present invention is not, of course, limited to the above embodiments; it may be modified in various ways within the scope of the appended claims.

What is claimed:

1. A drag device for double bearing type fishing reels, comprising side plates on the reel, a handle shaft supported on said plates of the reel so that said handle shaft is turned by a handle and turns a spool on a spool shaft, a spool shaft-turning pinion on said spool shaft, a driving gear meshed with said spool shaft-turning pinion, a sun gear which is rotatably fitted around said handle shaft so that said driving gear is turned with said handle shaft, a support member having planetary gears supported rotatably thereon, and said support member mounted on said handle shaft so that said support member is turned unitarily therewith, an internal gear formed on an inner circumferential portion of said driving gear with said planetary gears being meshed with said sun gear and said internal gear, a braking gear supported on said side plates of said reel, plate means to generate a braking force against said braking gear, a regulating knob pressing against said plate means, a gear meshed with said braking gear and mounted for turning with said sun gear, and a reverse rotation preventing mechanism provided on said handle shaft to prevent said handle shaft from turning in a direction opposite to a direction of winding a fishing line on said reel.

2. A drag device for fishing reels according to claim 1, wherein said sun gear is fitted around said handle shaft, said sun gear having an inner cylindrical shaft portion with said driving gear being fitted around said inner cylindrical shaft portion of said sun gear, said gear meshed with said braking gear being provided on and unitarily with said driving gear.

3. A drag device for double bearing type fishing reels, comprising side plates on the reel, a frame joining the side plates, a spool supported on the reel frame and having a spool shaft and a pinion mounted on the spool shaft, a support shaft projecting outward from the frame, a handle shaft which has a sun gear mounted unitarily thereon, and which is rotatably fitted around said support shaft so that said handle shaft can be turned, a driving gear rotatably fitted around said support shaft so that said driving gear can be turned therearound and engaging the pinion on the spool shaft, planetary gears supported rotatably on a side surface of said driving gear, a gear having an internal gear formed on an inner circumferential surface thereof, said planetary gear meshing with said internal gear, and also with said sun gear, means for rotatably supporting said gear on the reel, a braking gear meshed with said gear on said support shaft, the braking gear being supported on said side plates of said reel, means on said side plates of the reel for generating a braking force on said braking gear, a regulating knob for regulating said braking force, and a reverse rotation preventing mechanism provided on said handle shaft.

4. A drag device for double bearing type fishing reels according to claim 3, wherein said means for supporting said gear meshed with said braking gear comprises said side plates of said reel.

5. A drag device for double bearing type fishing reels according to claim 3, wherein said means for supporting said gear meshed with said braking gear comprises a portion of said driving gear.

6. A drag device for double bearing type fishing reels according to claim 3, wherein said means for supporting said gear meshed with said braking gear comprises said handle shaft.

7. A drag device for double bearing type fishing reels, comprising side plates on the reel, a frame joining the side plates, a spool supported on the reel frame and having a spool shaft and a pinion mounted on the spool shaft, a support shaft projecting outward from the frame, a handle shaft which is rotatably fitted around said support shaft so that said handle shaft can be turned, a plurality of planetary gears rotatably supported on the handle shaft, a driving gear meshed with the pinion and rotatably fitted around said support shaft so that said driving gear can be turned, a sun gear provided unitarily on said driving gear and meshed with said planetary gears, a gear and means for rotatably supporting the gear on the reel, an internal gear formed on an inner circumferential surface of said gear on said support shaft and meshed with said planetary gears, a braking gear meshed with said gear on said support shaft, said braking gear being supported on said side plates of said reel, means for generating a braking force on said braking gear, a braking knob for regulating said braking force, and a reverse rotation preventing mechanism provided on said handle shaft.

8. A drag device for double bearing type fishing reels according to claim 7, wherein said means for supporting said gear meshed with said braking gear comprises said side plates of said reel.

9. A drag device for double bearing type fish reels according to claim 7, wherein said means for supporting said gear meshed with said braking gear comprises a portion of said driving gear.

10. A drag device for double bearing type fishing reels according to claim 7, wherein said means for supporting said gear meshed with said braking gear comprises said handle shaft.

11. A drag device for double bearing type fishing reels, comprising side plates on a reel, a handle shaft supported rotatably on said side plates of the reel, a spool on a spool shaft rotated by said handle shaft, a spool shaft-turning pinion on said spool shaft, a driving gear meshed with said spool shaft-turning pinion with said driving gear rotatable around the axis of said handle shaft, a planetary gear mechanism connecting said handle shaft and said driving gear in an interlocking arrangement, a gear member meshing with planetary gears in said planetary gear mechanism, a gear mounted to rotate integrally with said gear member, a braking gear which is supported by said side plates of said reel meshed with said gear, an adjustable braking force means for applying a force to said braking gear, a regulating knob for adjusting said braking force and a reverse rotation prevention mechanism provided on said handle shaft to prevent said handle shaft from turning in a direction opposite to a direction of winding a fishing line on said reel.

* * * * *